United States Patent
Dairiki et al.

(10) Patent No.: US 11,396,236 B2
(45) Date of Patent: Jul. 26, 2022

(54) ELECTRIC VEHICLE CONTROL DEVICE

(71) Applicant: Mitsubishi Electric Corporation, Tokyo (JP)

(72) Inventors: Satoru Dairiki, Tokyo (JP); Tetsuo Sugahara, Tokyo (JP); Sho Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 262 days.

(21) Appl. No.: 16/956,934

(22) PCT Filed: Dec. 28, 2017

(86) PCT No.: PCT/JP2017/047307
§ 371 (c)(1),
(2) Date: Jun. 22, 2020

(87) PCT Pub. No.: WO2019/130564
PCT Pub. Date: Jul. 4, 2019

(65) Prior Publication Data
US 2020/0406762 A1 Dec. 31, 2020

(51) Int. Cl.
*H02P 5/74* (2006.01)
*H02P 21/00* (2016.01)
(Continued)

(52) U.S. Cl.
CPC .............. *B60L 50/51* (2019.02); *B60L 50/14* (2019.02); *B60W 10/08* (2013.01);
(Continued)

(58) Field of Classification Search
None
See application file for complete search history.

(56) References Cited

U.S. PATENT DOCUMENTS 5,847,534 A 12/1998 Tanamachi et al.
8,063,596 B2 * 11/2011 Imura .................. B60L 15/025
318/434
(Continued)

FOREIGN PATENT DOCUMENTS

JP H0956005 A 2/1997
JP H09107602 A 4/1997
(Continued)

OTHER PUBLICATIONS

Office Action dated Mar. 17, 2021, for Indian patent Application No. 202027026084, 7 pages.
(Continued)

*Primary Examiner* — Kenneth B Wells
(74) *Attorney, Agent, or Firm* — Buchanan Ingersoll & Rooney PC (57) ABSTRACT

An electric vehicle control device includes a plurality of drive control systems that controls travelling of an electric vehicle. Each of the drive control systems includes an induction motor, an inverter that drives the induction motor, and a controller that controls the inverter. Each of the controllers of the plurality of drive control systems includes a miswiring detector that calculates a torque estimation value on a basis of motor currents and voltage command values and detects miswiring between the induction motor and the inverter on a basis of the calculated torque estimation value and the torque command value.

6 Claims, 10 Drawing Sheets

(51) Int. Cl.
- *H02P 21/14* (2016.01)
- *H02P 21/22* (2016.01)
- *H02P 27/06* (2006.01)
- *B60L 50/51* (2019.01)
- *B60L 50/14* (2019.01)
- *B60W 10/08* (2006.01)

(52) U.S. Cl.
CPC ... *B60L 2240/423* (2013.01); *B60L 2240/427* (2013.01); *B60L 2240/429* (2013.01)

(56) References Cited

U.S. PATENT DOCUMENTS

| | | | | |
|---|---|---|---|---|
| 9,488,687 | B2* | 11/2016 | Matsumura | G01R 31/67 |
| 9,654,031 | B2* | 5/2017 | Sakanoue | B60L 3/0061 |
| 9,793,843 | B2* | 10/2017 | Kakizaki | H02P 6/12 |
| 10,063,166 | B2* | 8/2018 | Oka | H02P 29/0241 |
| 10,389,290 | B2* | 8/2019 | Higashino | H02P 29/024 |

FOREIGN PATENT DOCUMENTS

| | | |
|---|---|---|
| JP | 2004080924 A | 3/2004 |
| JP | 3933983 B2 | 6/2007 |
| JP | 2010213557 A | 9/2010 |
| JP | 2014023282 A | 2/2014 |
| JP | 2017060312 A | 3/2017 |

OTHER PUBLICATIONS

International Search Report (PCT/ISA/210) dated Mar. 6, 2018, by the Japan Patent Office as the International Searching Authority for International Application No. PCT/JP2017/047307.

Written Opinion (PCT/ISA/237) dated Mar. 6, 2018, by the Japan Patent Office as the International Searching Authority for International Application No. PCT/JP2017/047307.

Office Action dated Aug. 4, 2020, issued in corresponding Japanese Patent Application No. 2019562692, 8 pages including 5 pages of English translation.

Office Action dated Dec. 1, 2020, issued in corresponding Japanese Patent Application No. 2019562692, 7 pages including 4 pages of English translation.

* cited by examiner

ELECTRIC VEHICLE CONTROL DEVICE

FIELD

The present invention relates to an electric vehicle control device used in an electric vehicle driven by a plurality of induction motors, the device controlling power converters that supply power to the plurality of induction motors.

BACKGROUND

When a plurality of induction motors are connected to power converters of an electric vehicle, phase sequence of some of the induction motors can be miswired. Patent Literature 1 mentioned below discloses a three-phase synchronous motor controlling device having a miswiring detection function of detecting miswiring of the three-phase synchronous motor.

CITATION LIST

Patent Literature

Patent Literature 1: Japanese Patent Application Laid-open No. 2010-213557

SUMMARY

Technical Problem

For the controlling device disclosed in Patent Literature 1 described above, the miswiring can be detected by a simple method. The controlling device of Patent Literature 1 is provided for the three-phase synchronous motor. Patent Literature 1 makes no mention about miswiring detection for an induction motor. The induction motor has a concept called "slip" unlike a synchronous motor.

Assume that phase sequence of one of a plurality of induction motors which drive the electric vehicle is miswired. In such a case, the miswired induction motor is driven by output torque of the properly wired induction motor. The slip of the induction motor accommodates a difference in operating state between the induction motors. As a result, rotational speeds of the plurality of induction motors including the miswired induction motor are adjustable in accordance with a command value, during which reactive current continues flowing through the induction motor placed in the miswiring condition. Such continuous flow of reactive current is undesirable for the induction motor. When the vehicle electric vehicle keeps traveling failing to detect miswiring, the induction motor placed in the miswiring condition may malfunction or deteriorate. To address these problems, there is a need for a technique using a simple method to detect the miswired induction motor from among the plurality of induction motors.

The present invention has been made in view of the above, and an object of the present invention is to obtain an electric vehicle control device that can detect, by a simple method, whether an induction motor is miswired or not.

Solution to Problem

To solve the above-stated problem and achieve the object, according to the present invention, there is provided an electric vehicle control device comprising a plurality of drive control systems. The drive control systems control travelling of an electric vehicle. Each of the plurality of drive control systems includes: an induction motor; an inverter to drive the induction motor; a current detector to detect motor currents flowing through the induction motor; a speed detector to detect a rotational speed of the induction motor; and a controller to control the inverter on a basis of a torque command value, the detected motor currents, and voltage command values calculated on a basis of the detected rotational speed. The controller includes a miswiring detector to calculate a torque estimation value on a basis of the motor currents and the voltage command values and to detect miswiring between the induction motor and the inverter on a basis of the calculated torque estimation value and the torque command value.

Advantageous Effect of Invention

An electric vehicle control device according to the present invention can detect, by the simple method, whether the induction motor is miswired or not.

DESCRIPTION OF EMBODIMENTS

With reference to the accompanying drawings, a detailed description is hereinafter provided of electric vehicle control devices according to embodiments of the present invention. It is to be noted that the following embodiments are not restrictive of the present invention. It is also to be noted that in the following description, physical connection and electrical connection are simply referred to as "connection" without distinction.

First Embodiment

Figure 1:
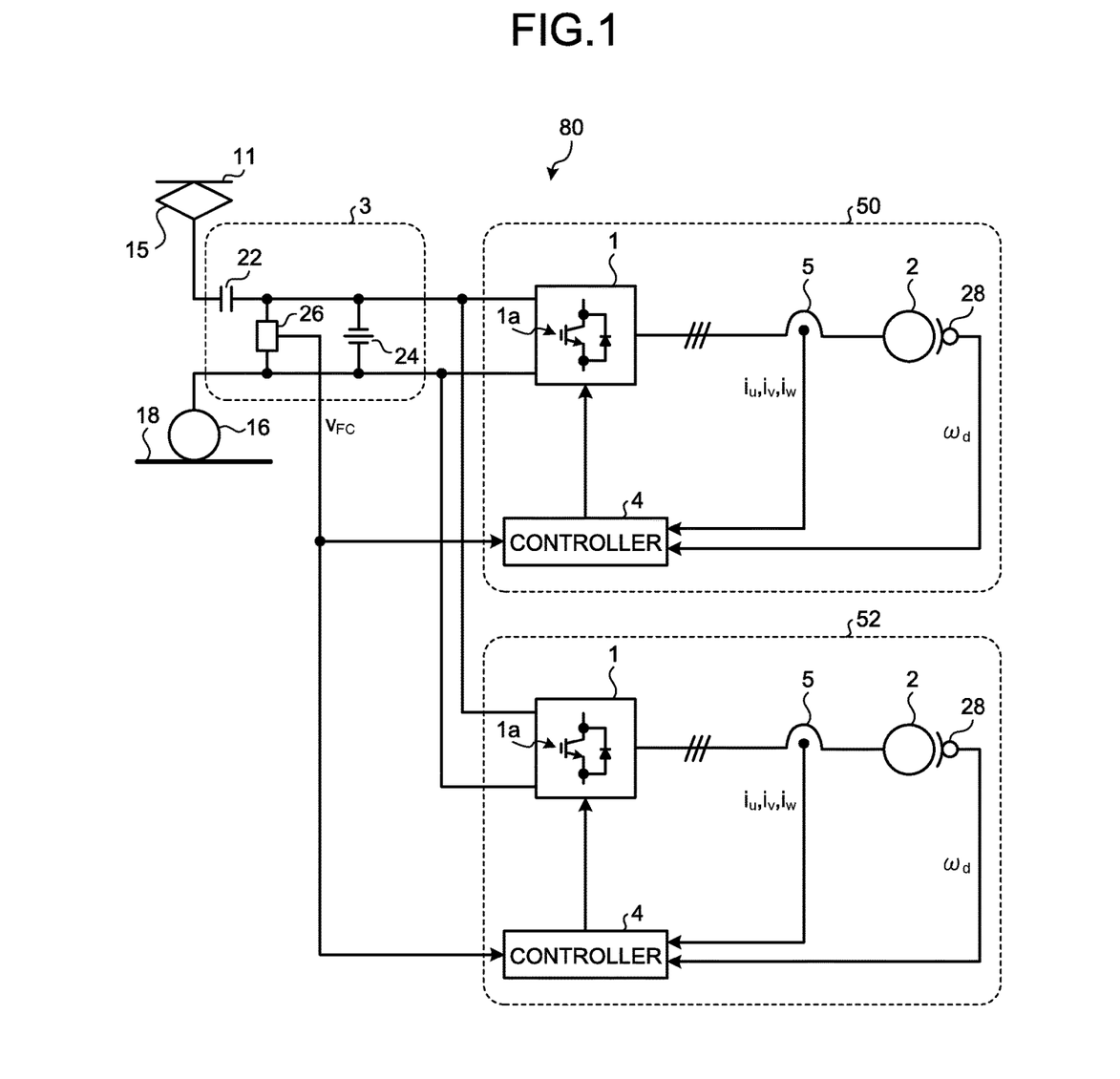
FIG. 1 is a configuration diagram of an electric vehicle drive system that includes an electric vehicle control device according to a first embodiment.

FIG. 1 is a configuration diagram of an electric vehicle drive system that includes an electric vehicle control device according to the first embodiment. FIG. 1 is an example in which the electric vehicle control device applies to a direct current electric motor vehicle. As illustrated in FIG. 1, the electric vehicle drive system 80 according to the first embodiment includes an input circuit 3, a first drive group 50, and a second drive group 52. The first drive group 50 defines a first drive control system, while the second drive group 52 defines a second drive control system. The first drive group 50 and the second drive group 52 controls travelling of the electric vehicle.

The input circuit 3 is connected to an overhead wire 11 via a pantograph 15 at its positive input side and is connected to a rail 18 via a wheel 16 at its negative input side. The first drive group 50 and the second drive group 52 are connected in parallel to an output side of the input circuit 3. These connections provide one electric circuit defined by the overhead wire 11, the pantograph 15, the input circuit 3, the first drive group 50, the wheel 16, and the rail 18, and another electric circuit defined by the overhead wire 11, the pantograph 15, the input circuit 3, the second drive group 52, the wheel 16, and the rail 18.

Power is supplied from the overhead wire 11 to the input circuit 3 via the pantograph 15. The power coming from the overhead wire 11 via the pantograph 15 and the input circuit 3 is supplied to the first drive group 50 and the second drive group 52.

The input circuit 3 includes a breaker 22, a filter capacitor 24, and a voltage detector 26. The breaker 22 opens and closes the connection between the overhead wire 11 and the first and second drive groups 50 and 52. The filter capacitor 24 smoothes and stores the power supplied from the overhead wire 11. The voltage detector 26 detects a voltage of the filter capacitor 24.

The first drive group 50 includes an inverter 1, an induction motor 2, a controller 4, and a current detector 5.

A high-potential-side connection end of the inverter 1 is connected to the pantograph 15 via the breaker 22 of the input circuit 3. A low-potential-side connection end of the inverter 1 is electrically connected to the wheel 16 via the input circuit 3. The inverter 1 is a power converter that converts direct current supplied from the input circuit 3, into variable voltage, variable frequency alternating current. The inverter 1 is connected to the induction motor 2 at its alternating current side. It is to be noted that a side of the inverter 1 on which an input circuit 3 is located is called "direct current side", while a side of the inverter 1 on which an induction motor 2 is located is called "alternating current side". The inverter 1 drives the induction motor 2. The induction motor 2 applies driving force to the electric vehicle.

The current detector 5 is disposed between the inverter 1 and the induction motor 2. The current detector 5 detects motor currents $i_u$, $i_v$, and $i_w$ that flow as phase currents through the induction motor 2. The motor currents $i_u$, $i_v$, and $i_w$ that are detected by the current detector 5 are values of detected currents flowing through one of a plurality of the induction motors 2. The motor currents $i_u$, $i_v$, and $i_w$ detected by the current detector 5 are input to the controller 4.

Mounted to the induction motor 2 is a speed detector 28. The speed detector 28 detects a rotational speed of the induction motor 2. The rotational speed $\omega_d$ is a value detected by the speed detector 28 and is input to the controller 4.

In addition to the above-mentioned motor currents $i_u$, $i_v$, and $i_w$ and rotational speed cod, the filter capacitor voltage $v_{FC}$ is input as a value detected by the voltage detector 26 to the controller 4. On the basis of information including the motor currents $i_u$, $i_v$, and $i_w$, the rotational speed $\omega_d$, and the filter capacitor voltage $v_{FC}$, a gate drive signal is generated and output to the inverter 1 by the controller 4 to drive a switching element 1a of the inverter 1. In order for the inverter 1, which is the power converter, to be controlled by pulse width modulation (PWM), a PWM signal is generated in the controller 4. The PWM signal is used to generate the gate drive signal.

The second drive group 52 has the same configuration as the first drive group 50. Elements of the second drive group 52 are identical to those of the first drive group 50 and are not described here.

Although FIG. 1 is the example of application of the electric vehicle control device to the direct current electric motor vehicle, it is to be noted that the configuration illustrated in FIG. 1 is also applicable to an alternating current electric motor vehicle. The alternating current electric motor vehicle differs from the direct current electric motor vehicle in configuration of the input circuit 3, but is identical thereto in basic configuration of the controller 4. Moreover, while FIG. 1 illustrates the two drive groups that are the first drive group 50 and the second drive group 52, three or more drive groups may be provided. It is to be noted that for a vehicle to which induction motors are mounted, generally, two trucks are mounted to the one vehicle and are generally each equipped with two induction motors.

As described above, each inverter 1 of the electric vehicle drive system 80 according to the first embodiment drives a corresponding one of the plurality of the induction motors 2 that drive the electric vehicle. The controllers 4 are included in the electric vehicle control device according to the first embodiment. The controllers 4 of the drive groups have identical functions. Therefore, a description below focuses on one of the controllers 4 that controls one of the drive groups.

Figure 2:
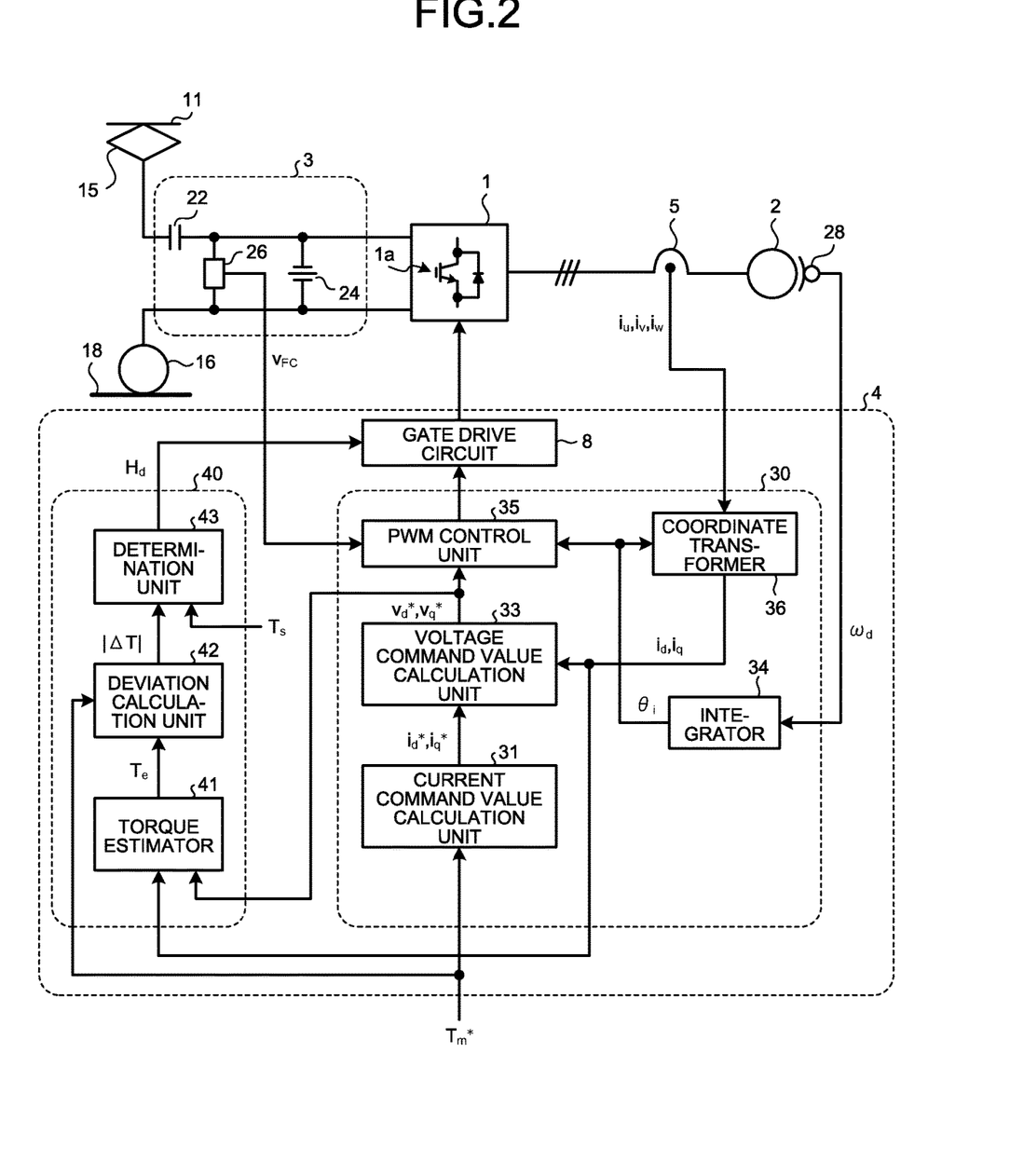
FIG. 2 is a block diagram illustrating a detailed configuration of a controller according to the first embodiment.

FIG. 2 is a block diagram illustrating a detailed configuration of the controller 4 according to the first embodiment. Those parts identical or equivalent to those illustrated in FIG. 1 have the same reference characters.

The controller 4 includes a gate drive circuit 8, a voltage control unit 30, and a miswiring detector 40.

The gate drive circuit 8 generates and outputs, to the inverter 1, a gate drive signal that drives the switching element 1a of the inverter 1. The voltage control unit 30 generates and outputs, to the gate drive circuit 8, a PWM signal that performs PWM control on the inverter 1. The miswiring detector 40 detects whether a mistake in wiring of the induction motor 2 being driven is made or not.

The voltage control unit 30 includes a current command value calculation unit 31, a voltage command value calculation unit 33, an integrator 34, a PWM control unit 35, and a coordinate transformer 36.

The coordinate transformer 36 transforms motor currents $i_u$, $i_v$, and $i_w$ detected by the current detector 5 into current values along a d axis and a q axis that are two axes of a rotating reference frame. A d-axis current $i_d$ and a q-axis current $i_q$ are the converted current values. The d axis is an axis referred to as a magnetic flux axis, while the q axis is an axis referred to as a torque axis. The d axis and the q axis are vectorially in orthogonal relation. The transformation processing that is performed by the coordinate transformer 36 is publicly known and is not described here. The d-axis and q-axis currents $i_d$ and $i_q$ provided by the coordinate transformer 36 are input to the voltage command value calculation unit 33 and the miswiring detector 40.

Input to the current command value calculation unit 31 is a torque command value $T_m^*$. The torque command value $T_m^*$ is a command value of torque that is to be output by the induction motor 2. The current command value calculation unit 31 calculates, on a basis of the torque command value $T_m^*$, a q-axis current command value $i_q^*$ and a d-axis current command value $i_d^*$. The q-axis current command value $i_q^*$ is a current command value along the torque axis. The d-axis current command value $i_d^*$ is a current command value along the magnetic flux axis. The arithmetic processing by the current command value calculation unit 31 is publicly known and is not described here. The q-axis and d-axis current command values $i_q^*$ and $i_d^*$ calculated by the current command value calculation unit 31 are input to the voltage command value calculation unit 33.

On a basis of the d-axis and q-axis current command values $i_d^*$ and $i_q^*$ calculated by the current command value calculation unit 31 and the d-axis and q-axis currents $i_d$ and $i_q$ output from the coordinate transformer 36, the voltage command value calculation unit 33 calculates a d-axis voltage command value $v_d^*$ and a q-axis voltage command value $v_q^*$. These voltage command values correspond to command values of voltages that are output from the inverter 1. A general method in vector control is such that the calculations are performed separately for a d-axis direction and a q-axis direction. The arithmetic processing by the voltage command value calculation unit 33 is publicly known and is not described here. The d-axis and q-axis voltage command values $v_d^*$ and $v_q^*$ calculated by the voltage command value calculation unit 33 are input to the PWM control unit 35 and the miswiring detector 40.

The integrator 34 determines, on a basis of the input rotational speed $\omega_d$, an angular frequency by internal arithmetic and calculates a phase $\theta_i$ by integrating the determined angular frequency. The angular frequency can be produced by addition of a slip speed of the induction motor 2 to the rotational speed $\omega_d$. The phase $\theta_i$ calculated by the integrator 34 is input to the PWM control unit 35 and the coordinate transformer 36. The coordinate transformer 36 uses the phase $\theta_i$ when calculating the d-axis current $i_d$ and the q-axis current $i_q$.

On a basis of the phase $\theta_i$, the d-axis voltage command value $v_d^*$, the q-axis voltage command value $v_q^*$, and the filter capacitor voltage $v_{FC}$, the PWM control unit 35 generates the PWM signal for performing PWM control on the switching element 1a of the inverter 1. The PWM signal generation processing is publicly known and is not described here.

A description is provided next of the miswiring detector 40. The miswiring detector 40 is a detector that detects whether a mistake in wiring of the induction motor 2 is made or not. The miswiring detector 40 includes a torque estimator 41, a deviation calculation unit 42, and a determination unit 43.

Input to the torque estimator 41 are the converted d-axis and q-axis currents $i_d$ and $i_q$ from the coordinate transformer 36 and the d-axis, and q-axis voltage command values $v_d^*$ and $v_q^*$ calculated by the voltage command value calculation unit 33. The torque estimator 41 calculates a torque estimation value $T_e$ on a basis of the d-axis current $i_d$, the q-axis current $i_q$, the d-axis voltage command value $v_d^*$, and the q-axis voltage command value $v_q^*$. The torque estimation value $T_e$ is not an externally input or indicated value, but an estimated value of torque that is calculated with internal control parameters of the controller 4. The torque estimation value $T_e$ calculated by the torque estimator 41 is input to the deviation calculation unit 42.

In addition to the torque estimation value $T_e$, the torque command value $T_m^*$ is input to the deviation calculation unit 42. The deviation calculation unit 42 calculates an absolute value $|\Delta T|$ of a deviation between the torque command value $T_m^*$ and the torque estimation value $T_e$. The absolute value $|\Delta T|$ of the deviation is input to the determination unit 43.

In addition to the absolute value $|\Delta T|$ of the deviation, a reference value $T_s$ is input to the determination unit 43. The reference value $T_s$ is a threshold used for detection of miswiring. The determination unit 43 compares the absolute value $|\Delta T|$ of the deviation with the reference value $T_s$. When the absolute value $|\Delta T|$ of the deviation is greater than the reference value $T_s$, the determination unit 43 determines that there is miswiring and outputs a miswiring detection signal $H_d$. The miswiring detection signal $H_d$ is output to the gate drive circuit 8. The miswiring detection signal $H_d$ is a control signal that forces the gate drive circuit 8 to stop operating. During the output of the miswiring detection signal $H_d$, the gate drive circuit 8 stops outputting the gate drive signal to the inverter 1 even when the PWM signal is input from the PWM control unit 35 thereto.

Figure 3:
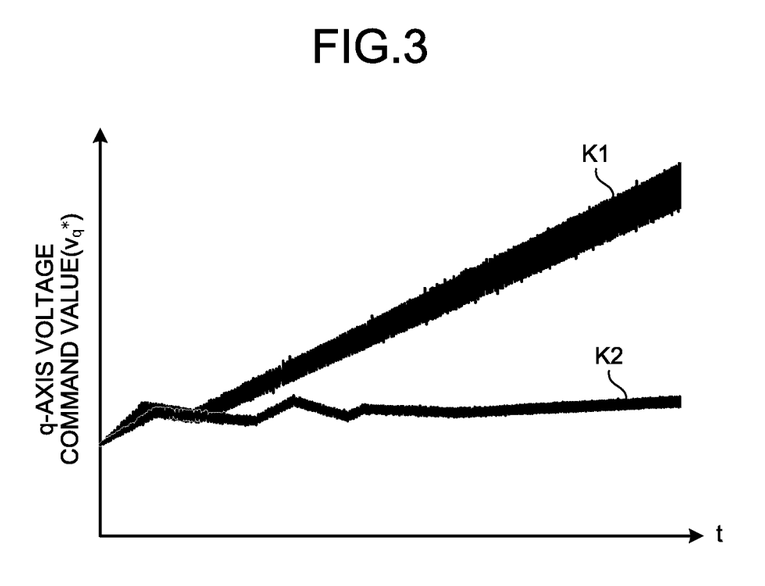
FIG. 3 is a first diagram that is used for explaining an operation principle of wiring detection.
Figure 4:
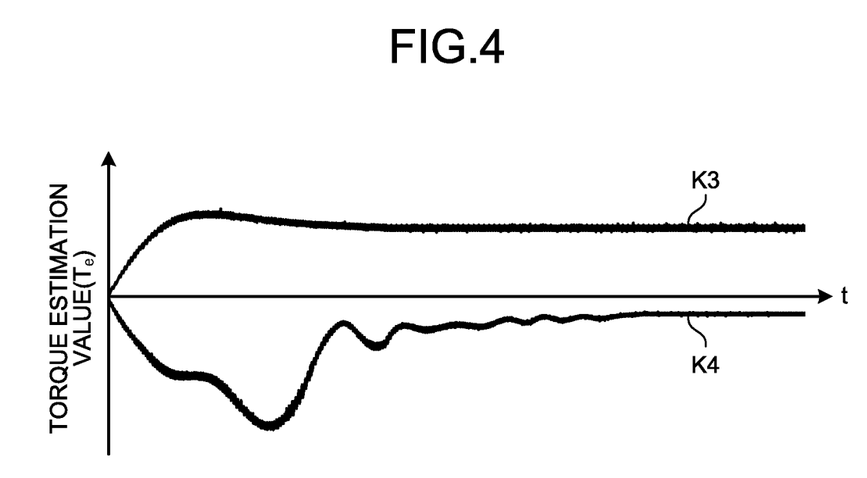
FIG. 4 is a second diagram that is used for explaining the operation principle of the wiring detection.

With reference to FIGS. 3 and 4, a description is provided next of an operation principle of wiring detection. FIG. 3 is a first diagram that is used for explaining the operation principle of the wiring detection. FIG. 4 is a second diagram that is used for explaining the operation principle of the wiring detection.

FIG. 3 illustrates respective time-varying waveforms of q-axis voltage command values $v_q^*$ when the induction motors 2 have been started. In FIG. 3, K1 is the waveform of the q-axis voltage command value $v_q^*$ calculated by the controller 4 controlling the properly wired induction motor 2. K2 is the waveform of the q-axis voltage command value $v_q^*$ calculated by the controller 4 controlling the induction motor 2 placed in a miswiring condition. As mentioned earlier, the q-axis voltage command value $v_q^*$ is calculated by the voltage command value calculation unit 33 and is a voltage command value along the q axis.

As indicated by the waveform K1, the q-axis voltage command value $v_q^*$ calculated by the controller 4 controlling the properly wired induction motor 2 forms a waveform that rises with time. On the other hand, as indicated by the waveform K2, the q-axis voltage command value $v_q^*$ calculated by the controller 4 controlling the induction motor 2 placed in the miswiring condition does not rise. This is because an actual direction of rotation is opposite to a direction in which the induction motor 2 driven by the torque command value $T_m^*$ should rotate.

FIG. 4 illustrates respective time-varying waveforms of torque estimation values $T_e$ when the induction motors 2 have been started. In FIG. 4, K3 is the waveform of the torque estimation value $T_e$ calculated by the controller 4 controlling the properly wired induction motor 2. K4 is the waveform of the torque estimation value $T_e$ calculated by the controller 4 controlling the induction motor 2 placed in a miswiring condition.

As indicated by the waveform K3, when the wiring is proper, the torque estimation value $T_e$ forms a waveform that follows the externally indicated torque command value $T_m^*$ (not illustrated). On the other hand, when the wiring is incorrect, as indicated by the waveform K4, the torque estimation value $T_e$ does not follow the externally indicated torque command value $T_m^*$ and is even opposite in polarity to the waveform K3. This is because the actual direction of rotation is opposite to the direction in which the induction motor 2 driven by the torque command value $T_m^*$ should rotate.

The inventors of the present application have focused on those control parameters that cause the different waveforms which are illustrated by FIGS. 3 and 4 and have discovered a simple method of accurately detecting the miswiring.

Figure 5:
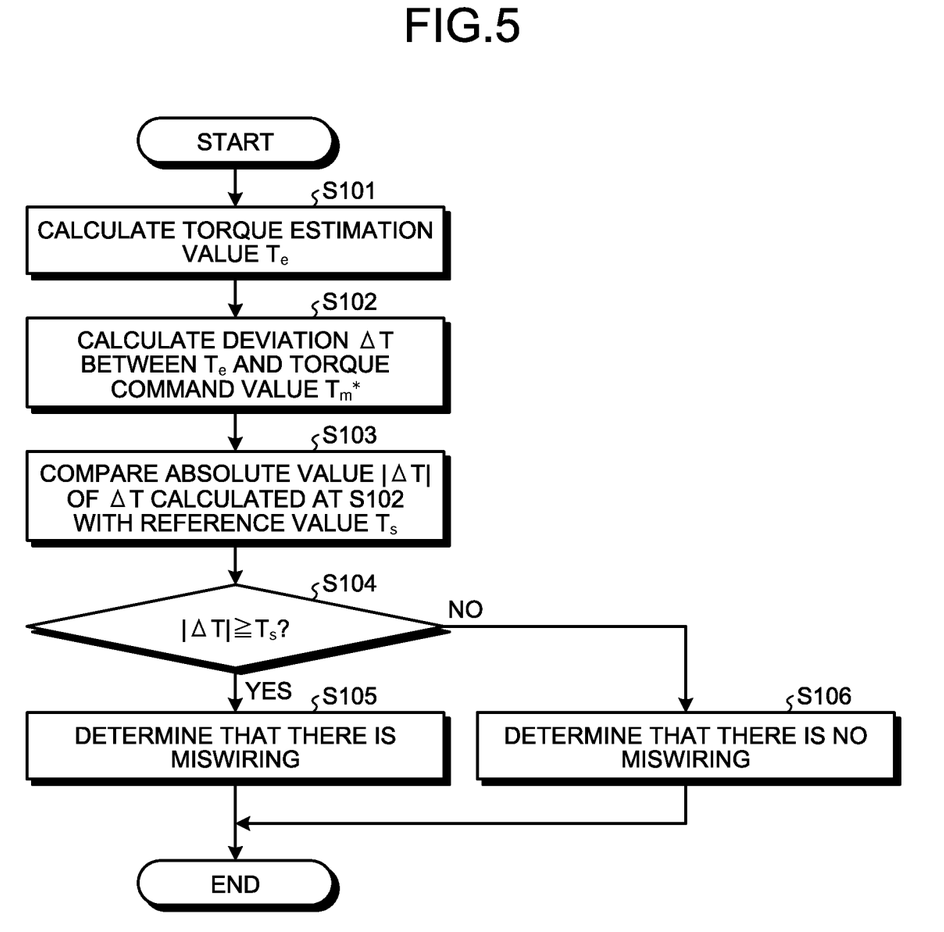
FIG. 5 is a flowchart illustrating an operational process of the miswiring detection according to the first embodiment.

With reference to FIGS. 2 and 5, a description is provided next of operation for the miswiring detection according to the first embodiment. FIG. 5 is a flowchart illustrating an operational process of the miswiring detection according to the first embodiment. In FIG. 5, step S101 is carried out by the torque estimator 41, step S102 is carried out by the deviation calculation unit 42, and steps S103 to S106 are carried out by the determination unit 43.

At step S101, the torque estimation value $T_e$ is calculated. At step S102, the deviation $\Delta T$ between the torque estimation value $T_e$ and the torque command value $T_m{}^*$ is calculated. At step S103, the absolute value $|\Delta T|$ of the deviation $\Delta T$ calculated at step S102 is compared with the reference value $T_s$.

If the absolute value $|\Delta T|$ is greater than or equal to the reference value $T_s$ here (Yes to step S104), the process proceeds to step S105. At step S105, a determination is made that "there is miswiring", and the process of FIG. 5 ends.

If, on the other hand, the absolute value $|\Delta T|$ is smaller than the reference value $T_s$ (No to step S104), the process proceeds to step S106. At step S106, a determination is made that "there is no miswiring", and the process of FIG. 5 ends.

It is to be noted that when the absolute value $|\Delta T|$ is equal to the reference value $T_s$, the process proceeds to step S105 making a determination of "Yes" in the above determination processing at step S104; however, the process may proceed to step S106 making a determination of "No". In other words, a determination of either "Yes" or "No" may be made when the absolute value $|\Delta T|$ is equal to the reference value $T_s$.

As described above, the electric vehicle control device according to the first embodiment is capable of detecting the miswiring of the induction motor 2 on the basis of the torque command value $T_m{}^*$ and the torque estimation value $T_e$. The method according to the first embodiment is a simple method that enables detection of miswiring of the induction motor 2 as the method uses the input torque-related information called the torque command value $T_m{}^*$ and the estimated torque-related information called the torque estimation value $T_e$.

The electric vehicle control device according to the first embodiment is also capable of detecting miswirings of some induction motors 2 among the plurality of the induction motors 2 and stopping driving of the induction motors 2 having the miswiring detected. Thus, it becomes possible to reduce or prevent continuous flow of reactive current through the induction motors 2 having the miswiring detected, so that the induction motors 2 placed in the miswiring conditions can have a decreased possibility of malfunction or deterioration.

Figure 6:
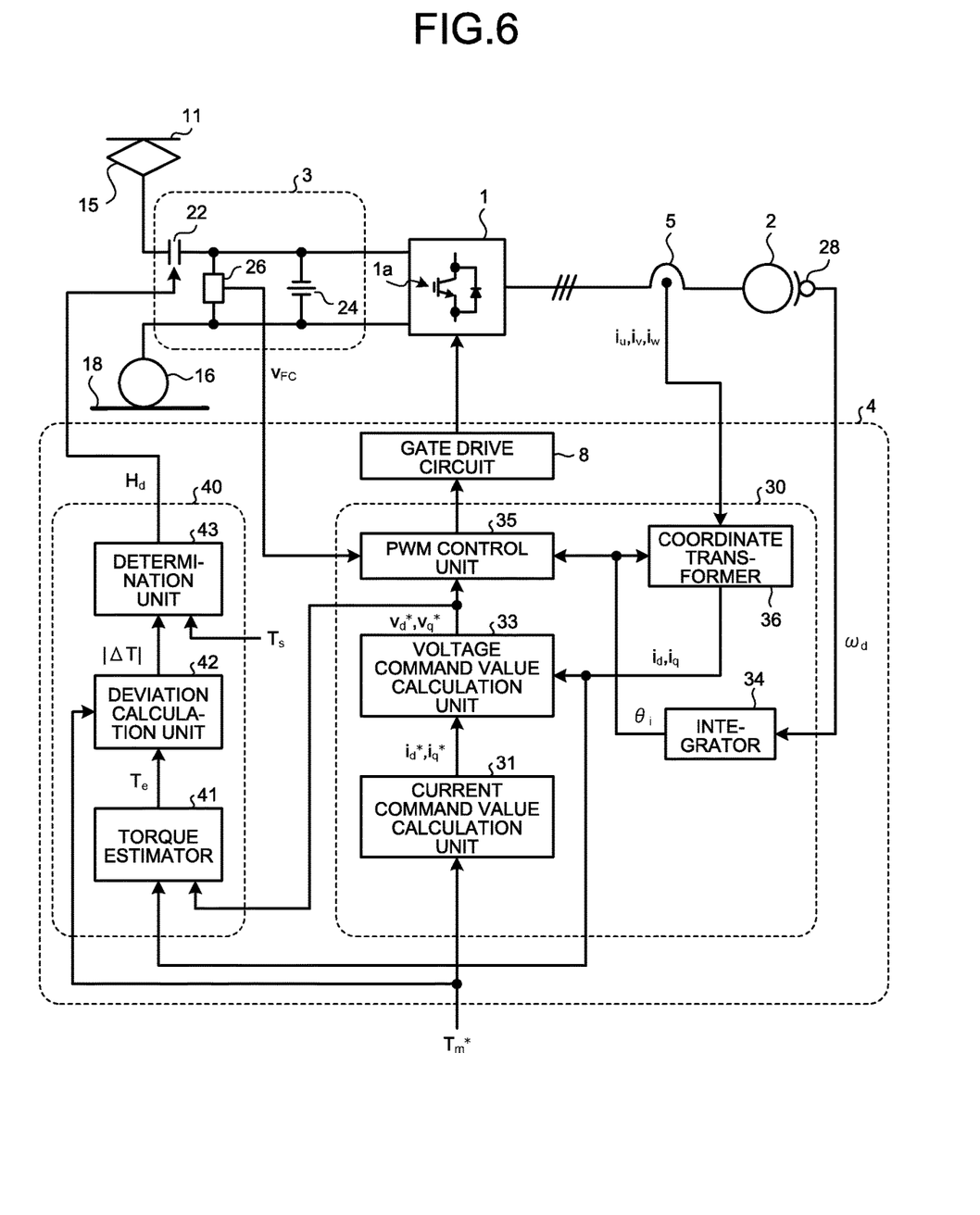
FIG. 6 is a block diagram illustrating a configuration of the controller according to the first embodiment, the configuration being a different example from that of FIG. 2.

FIG. 6 is a block diagram illustrating a configuration of the controller 4 according to the first embodiment, the configuration being a different example from that of FIG. 2. The difference from FIG. 2 is an output destination of the miswiring detection signal $H_d$. In other words, the miswiring detection signal $H_d$ is output to the gate drive circuit 8 in FIG. 2, whereas the miswiring detection signal $H_d$ is output to the breaker 22 in FIG. 6. Upon receiving the miswiring detection signal $H_d$, the breaker 22 opens a contact (not illustrated) to cut off the power that is supplied from the overhead wire 11.

The configuration of FIG. 2 is advantageous in that the electric vehicle can continue its operation, because only the induction motor 2 placed in a miswiring condition can stop being driven. The configuration of FIG. 6 cannot stop driving of only the induction motor 2 placed in a miswiring condition. Instead, the configuration of FIG. 6 can cut off the power supply near the overhead wire 11, so that the operation of an electric vehicle can be advantageously brought to a quick stop. One inverter carries larger current in driving one induction motor of the electric vehicle than one inverter in driving a plurality of induction motors. Therefore, the configuration of FIG. 6 that can bring the operation of the electric vehicle to the quick stop is useful for an electric vehicle having large-current applications.

Second Embodiment

Figure 7:
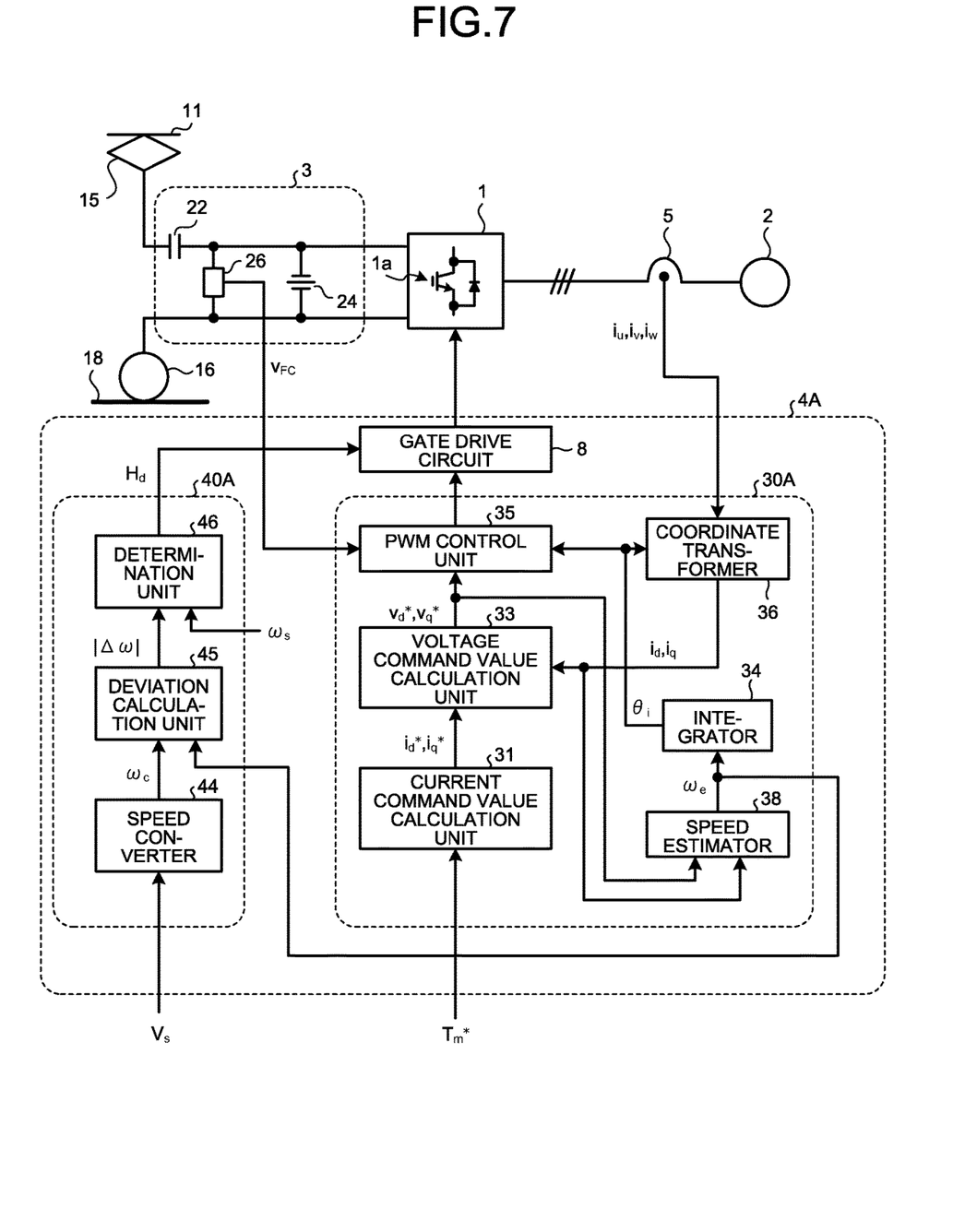
FIG. 7 is a block diagram illustrating a detailed configuration of a controller according to a second embodiment.

FIG. 7 is a block diagram illustrating a detailed configuration of a controller 4A according to the second embodiment. The controller 4A according to the second embodiment includes a voltage control unit 30A and a miswiring detector 40A.

The voltage control unit 30A includes a speed estimator 38 in addition to the configuration of the voltage control unit 30 according to the first embodiment illustrated by FIG. 1. Moreover, compared with the miswiring detector 40 configured according to the first embodiment illustrated by FIG. 1, the miswiring detector 40A includes a speed converter 44 replacing the torque estimator 41, a deviation calculation unit 45 replacing the deviation calculation unit 42, and a determination unit 46 replacing the determination unit 43.

Furthermore, while the controller 4 according to the first embodiment uses, for performing the subsequent control, the rotational speed cod detected by the speed detector 28, the controller 4A according to the second embodiment is a controller that performs so-called speed-sensorless control which does not use the detected value of the speed detector 28. It is to be noted that the configuration is otherwise identical or equivalent to the configuration of the first embodiment except for input and output signals, and those identical or equivalent components have the same reference characters and are not described in order to omit redundancy. The input and output signals are described later.

Input to the speed estimator 38 are the d-axis and q-axis currents $i_d$ and $i_q$ provided by the coordinate transformer 36, and the d-axis and q-axis voltage command values $v_d{}^*$ and $v_q{}^*$ calculated by the voltage command value calculation unit 33. The speed estimator 38 calculates a speed estimation value $\omega_e$ on a basis of the d-axis and q-axis currents $i_d$ and $i_q$ and the d-axis and q-axis voltage command values $v_d{}^*$ and $v_q{}^*$. The speed estimation value $\omega_e$ is a substitute for the rotational speed cod that is the detected value of the speed detector 28 used in the first embodiment. The speed estimation value $\omega_e$ calculated by the speed estimator 38 is input to the integrator 34 of the voltage control unit 30A, and the deviation calculation unit 45 of the miswiring detector 40A. It is to be noted that a method of calculating the speed estimation value $\omega_e$ is publicly known and is not described here in detail. The concrete calculation method is disclosed, for example, by Japanese Patent No. 4437629, contents of which should be referred to.

The integrator 34 determines, on a basis of the input speed estimation value $\omega_e$, an angular frequency by internal arithmetic and calculates the phase $\theta_i$ by integrating the determined angular frequency.

Input to the speed converter 44 is a vehicle speed $V_s$ that is external vehicle speed information. The vehicle speed information may be traveling speed information managed by a train or actual detected information on a traveling speed. The speed converter 44 converts the vehicle speed $V_s$ into a converted speed $\omega_c$. The converted speed $\omega_c$ is a value resulting from conversion of the vehicle speed $V_s$ into a rotational speed of the induction motor 2. The converted speed $\omega_c$ calculated by the speed converter 44 is input to the deviation calculation unit 45.

In addition to the converted speed $\omega_c$, the speed estimation value $\omega_e$ is input to the deviation calculation unit 45. The deviation calculation unit 45 calculates an absolute value $|\Delta\omega|$ of a deviation between the converted speed $\omega_c$ and the speed estimation value $\omega_e$. The absolute value $|\Delta\omega|$ of the deviation is input to the determination unit 46.

In addition to the absolute value $|\Delta\omega|$ of the deviation, a reference value $\omega_s$ is input to the determination unit 46. The reference value $\omega_s$ is a threshold used for detection of miswiring. The determination unit 46 compares the absolute value $|\Delta\omega|$ of the deviation with the reference value $\omega_s$. When the absolute value $|\Delta\omega|$ of the deviation is greater than the reference value $\omega_s$, the determination unit 46 determines that there is miswiring and outputs the miswiring detection signal $H_d$ to the gate drive circuit 8. In FIG. 7, the miswiring detection signal $H_d$ is output to the gate drive circuit 8; however, it is to be noted that the miswiring detection signal $H_d$ may be output to the breaker 22 as in FIG. 6.

Figure 8:
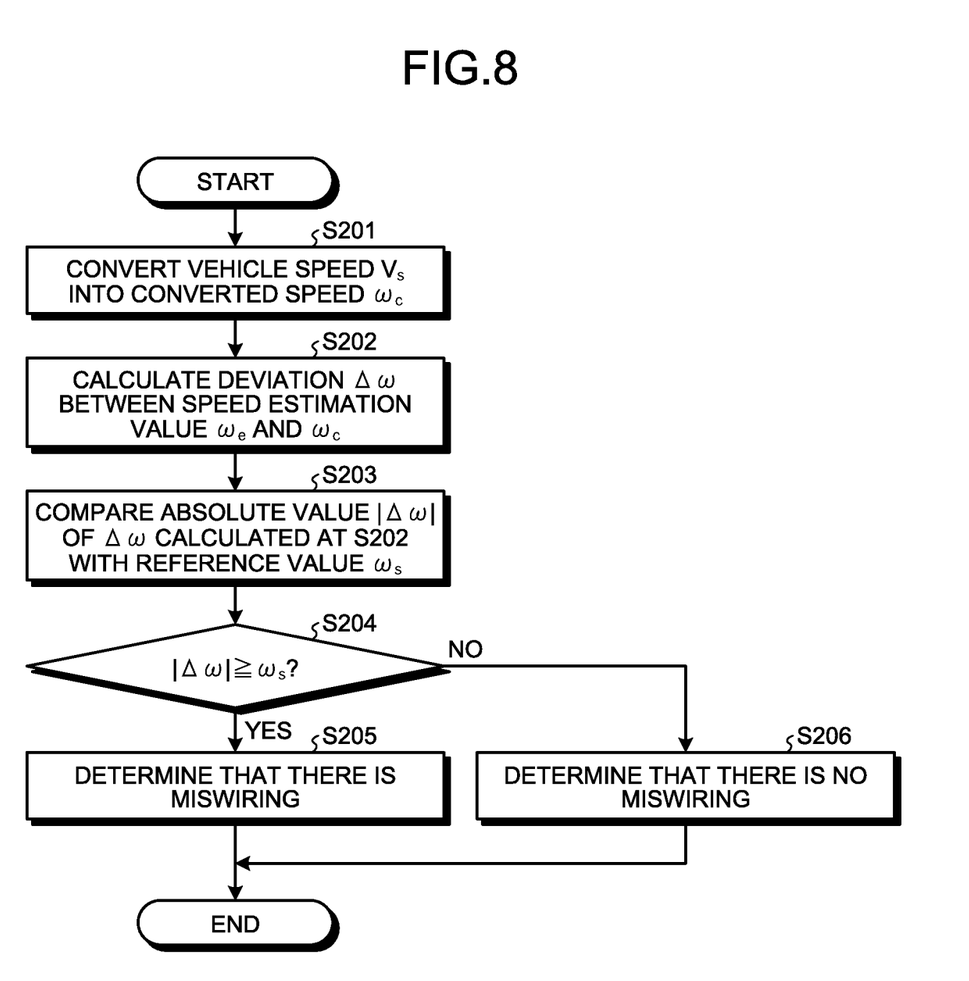
FIG. 8 is a flowchart illustrating an operational process of miswiring detection according to the second embodiment.

With reference to FIGS. 7 and 8, a description is provided next of operation for miswiring detection according to the second embodiment. FIG. 8 is a flowchart illustrating an operational process of the miswiring detection according to the second embodiment. In FIG. 8, step S201 is carried out by the speed converter 44, step S202 is carried out by the deviation calculation unit 45, and steps S203 to S206 are carried out by the determination unit 46.

At step S201, the vehicle speed $V_s$ is converted into the converted speed $\omega_c$. At step S202, the deviation $\Delta\omega$ between the speed estimation value $\omega_e$ and the converted speed $\omega_c$ is calculated. At step S203, the absolute value $|\Delta\omega|$ of the deviation $\Delta\omega$ calculated at step S202 is compared with the reference value $\omega_s$. The reference value $\omega_s$ is set as a determining value that is used for prevention of misdetection which is caused by noise and others. In other words, the reference value $\omega_s$ is a set value provided for improved accuracy of the miswiring detection.

If the absolute value $|\Delta\omega|$ is greater than or equal to the reference value $\omega_s$ (Yes to step S204), the process proceeds to step S205. At step S205, a determination is made that "there is miswiring", and the process of FIG. 8 ends.

If, on the other hand, the absolute value $|\Delta\omega|$ is smaller than the reference value $\omega_s$ (No to step S204), the process proceeds to step S206. At step S206, a determination is made that "there is no miswiring", and the process of FIG. 8 ends.

It is to be noted that when the absolute value $|\Delta\omega|$ is equal to the reference value $\omega_s$, the process proceeds to step S205 making a determination of "Yes" in the above determination processing at step S204; however, the process may proceed to step S206 making a determination of "No". In other words, a determination of either "Yes" or "No" may be made when the absolute value $|\Delta\omega|$ is equal to the reference value $\omega_s$.

An electric vehicle control device according to the second embodiment described above is capable of detecting the miswiring of the induction motor 2 on the basis of the vehicle speed $V_s$ and the speed estimation value $\omega_e$. The method according to the second embodiment uses the input speed-related information called the vehicle speed $V_s$ and the estimated speed-related information called the speed estimation value $\omega_e$. According to the second embodiment, miswiring of the induction motor 2 can therefore be detected by such a simple method.

The electric vehicle control device according to the second embodiment is also capable of detecting miswirings of some induction motors 2 among the plurality of the induction motors 2 and stopping driving of the induction motors 2 having the miswiring detected. Thus, it becomes possible to reduce or prevent continuous flow of reactive current through the induction motors 2 having the miswiring detected, so that the induction motors 2 placed in the miswiring conditions can have a decreased possibility of malfunction or deterioration.

Although the miswiring detection signal $H_d$ is output to the gate drive circuit 8 in FIG. 7, the miswiring detection signal $H_d$ may be output to the breaker 22 as in FIG. 6. Because the miswiring detection signal $H_d$ is output to the breaker 22, the effect of the FIG. 6 configuration described in the first embodiment can be obtained.

Third Embodiment

Figure 9:
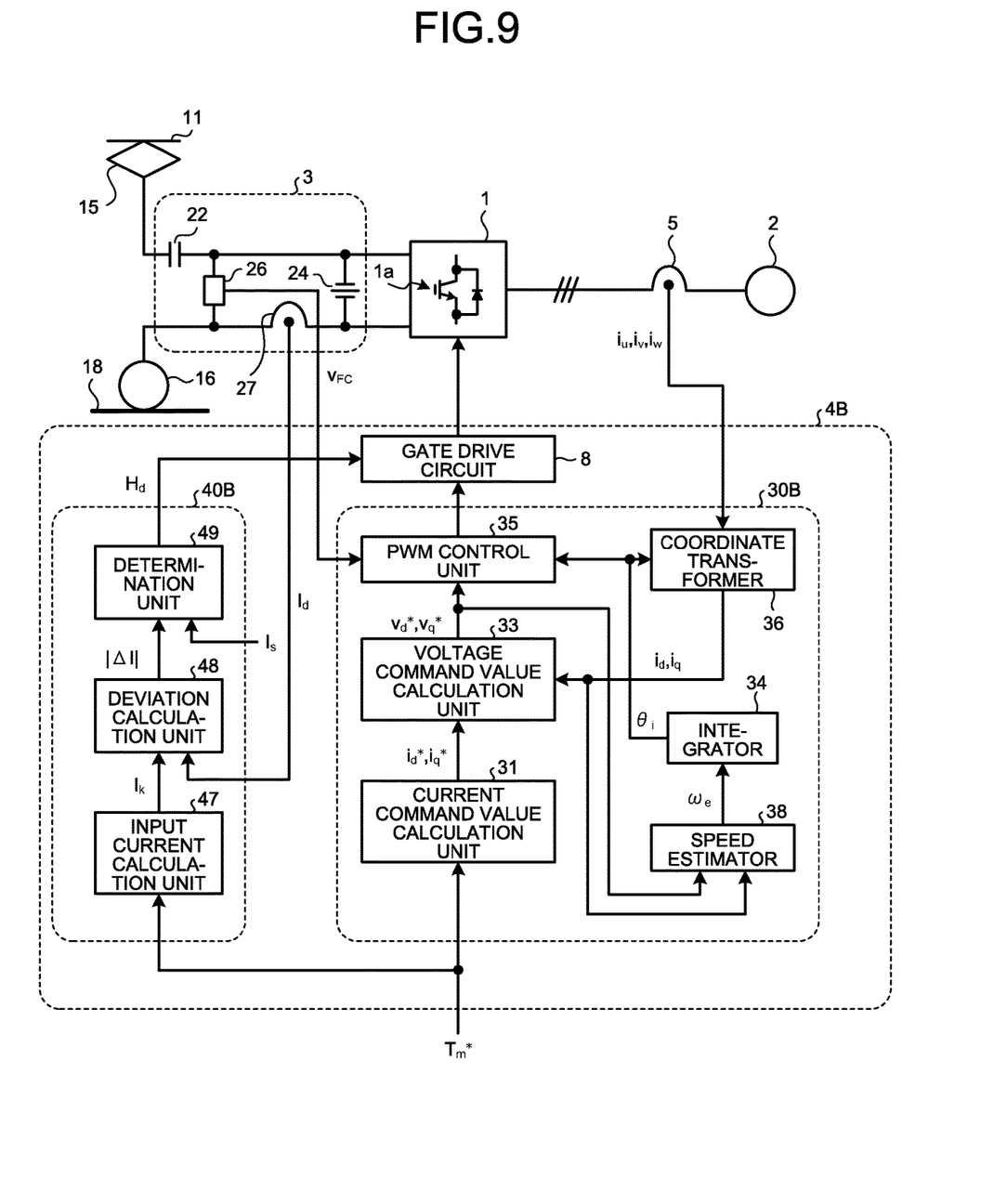
FIG. 9 is a block diagram illustrating a detailed configuration of a controller according to a third embodiment.

FIG. 9 is a block diagram illustrating a detailed configuration of a controller 4B according to the third embodiment. The controller 4B according to the third embodiment includes a voltage control unit 30B and a miswiring detector 40B.

Compared with the FIG. 7 miswiring detector 40A configured according to the second embodiment, the miswiring detector 40B includes an input current calculation unit 47 replacing the speed converter 44, a deviation calculation unit 48 replacing the deviation calculation unit 45, and a determination unit 49 replacing the determination unit 46.

Moreover, the controller 4B according to the third embodiment is configured such that a detected current value $I_d$ provided by a current detector 27 provided in the input circuit 3, and the torque command value $T_m^*$ are input to the miswiring detector 40B. The configuration is otherwise identical or equivalent to the configuration of the second embodiment, and those identical or equivalent components have the same reference characters and are not described in order to omit redundancy. It is to be noted that where the current detector 5 and the current detector 27 are referred to without reference characters, the current detector 5 is referred to as "first current detector", and the current detector 27 is referred to as "second current detector".

In the configuration of FIG. 9, the current detector 27 detects a current flowing through the input circuit 3. The current flowing through the input circuit 3 is also a total value of currents flowing through a plurality of the inverters 1 connected to the input circuit 3.

The torque command value $T_m^*$ is input to the input current calculation unit 47. The input current calculation unit 47 calculates, on a basis of the torque command value $T_m^*$, a total value $I_k$ of currents that will flow into respective input sides of the plurality of the inverters 1 assuming that proper wiring interconnect the inverters 1 and the induction motors 2. The total value $I_k$ of the currents can be calculated using a publicly known formula. The total value $I_k$ of the currents, calculated by the input current calculation unit 47 is input to the deviation calculation unit 48.

In addition to the total value $I_k$ of the currents, the detected current value $I_d$ detected by the current detector 27 is input to the deviation calculation unit 48. The deviation calculation unit 48 calculates an absolute value $|\Delta I|$ of a deviation between the total value $I_k$ of the currents and the detected current value $I_d$. The absolute value $|\Delta I|$ of the deviation is input to the determination unit 49.

In addition to the absolute value $|\Delta I|$ of the deviation, a reference value $I_s$ is input to the determination unit 49. The reference value $I_s$ is a threshold used for detection of miswiring. The determination unit 49 compares the absolute value $|\Delta I|$ of the deviation with the reference value $I_s$. When the absolute value $|\Delta I|$ of the deviation is greater than the reference value $I_s$, the determination unit 49 determines that there is miswiring and outputs the miswiring detection signal $H_d$ to the gate drive circuit 8. In FIG. 9, the miswiring detection signal $H_d$ is output to the gate drive circuit 8; however, it is to be noted that the miswiring detection signal $H_d$ may be output to the breaker 22 as in FIG. 6.

Figure 10:
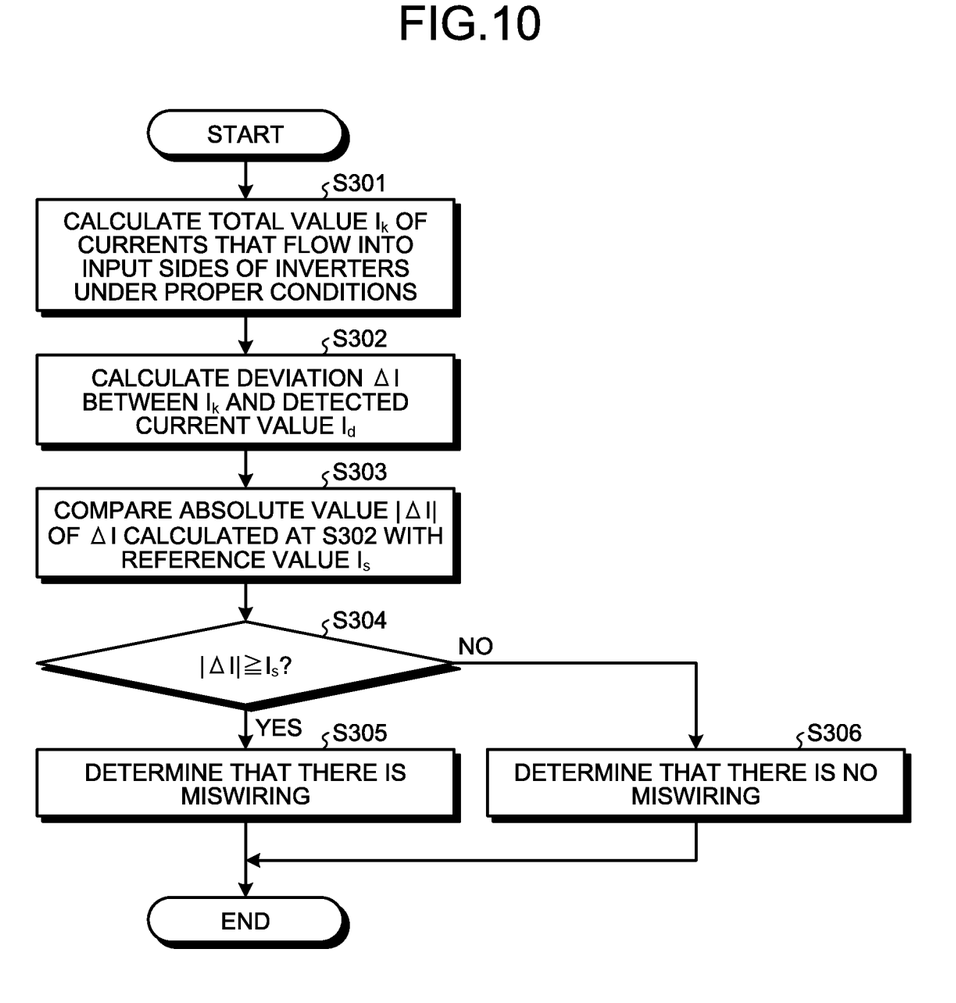
FIG. 10 is a flowchart illustrating an operational process of miswiring detection according to the third embodiment.

With reference to FIGS. 9 and 10, a description is provided next of operation for miswiring detection according to the third embodiment. FIG. 10 is a flowchart illustrating an operational process of the miswiring detection according to the third embodiment. In FIG. 10, step S301 is carried out by the input current calculation unit 47, step S302 is carried out by the deviation calculation unit 48, and steps S303 to S306 are carried out by the determination unit 49.

At step S301, the total value $I_k$ of the currents that flow into the input sides of the plurality of the inverters 1 under proper conditions is calculated. At step S302, the deviation $\Delta I$ between the total value $I_k$ of the currents and the detected current value $I_d$ is calculated. At step S303, the absolute value $|\Delta I|$ of the deviation $\Delta I$ calculated at step S302 is compared with the reference value $I_s$.

If the absolute value $|\Delta I|$ is greater than or equal to the reference value $I_s$ here (Yes to step S304), the process proceeds to step S305. At step S305, a determination is made that "there is miswiring", and the process of FIG. 10 ends.

If, on the other hand, the absolute value $|\Delta I|$ is smaller than the reference value $I_s$ (No to step S304), the process proceeds to step S306. At step S306, a determination is made that "there is no miswiring", and the process of FIG. 10 ends.

It is to be noted that when the absolute value $|\Delta I|$ is equal to the reference value $I_s$, the process proceeds to step S305 making a determination of "Yes" in the above determination processing at step S304; however, the process may proceed to step S306 making a determination of "No". In other words, a determination of either "Yes" or "No" may be made when the absolute value $|\Delta I|$ is equal to the reference value $I_s$.

An electric vehicle control device according to the third embodiment described above is capable of detecting the miswiring of the induction motor 2 on the basis of the total value $I_k$ of the currents that flow into the input sides of the individual inverters 1 under the proper conditions, and the detected current value $I_d$ detected by the current detector 27. As described above, the total value $I_k$ of the currents that flow into the input sides of the individual inverters 1 can be calculated using the torque command value $T_m^*$. The method according to the third embodiment thus uses the input torque-related information called the torque command value $T_m^*$ and the input current-related information called the detected current value $I_d$. According to the third embodiment, miswiring of the induction motor 2 can therefore be detected by such a simple method.

The controller illustrated in FIG. 9 performs speed-sensorless control that does not use a detected value provided by the speed detector 28 as with the controller 4A according to the second embodiment illustrated in FIG. 7; however, as with the controller 4 according to the first embodiment illustrated in FIG. 2, the controller of FIG. 9 may be applied to a drive control system that utilizes the detected value provided by the speed detector 28.

Moreover, although the miswiring detection signal $H_d$ is output to the gate drive circuit 8 in FIG. 9, the miswiring detection signal $H_d$ may be output to the breaker 22 as in FIG. 6. However, it is difficult to determine in which induction motor 2 the miswiring occurs in the third embodiment. For this reason, in the presence of even one induction motor 2 placed in a miswiring condition, each of the controllers 4B detects this miswiring, such that all the induction motors 2 stop being driven. Therefore, in the third embodiment, an effect obtained when the miswiring detection signal $H_d$ is output to the gate drive circuit 8 and an effect obtained when the miswiring detection signal $H_d$ is output to the breaker 22 are tantamount, meaning that a difference between these effects is not significant.

Figure 11:
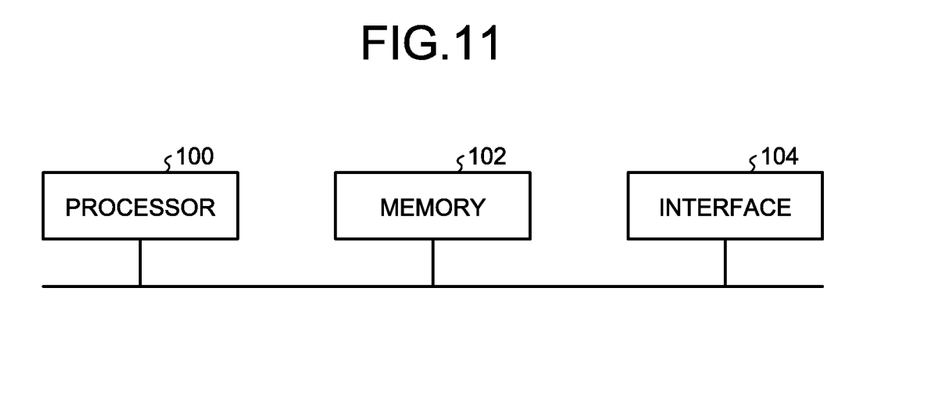
FIG. 11 is a block diagram illustrating a configuration example of hardware that functionally implements miswiring detectors according to the first, second, and third embodiments.
Figure 12:
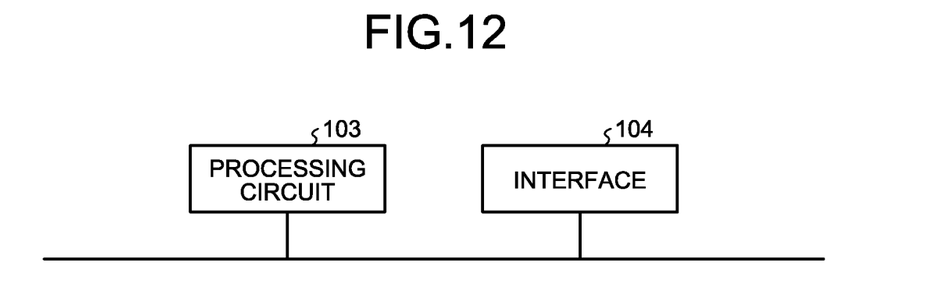
FIG. 12 is a block diagram illustrating another configuration example of the hardware that functionally implements the miswiring detectors according to the first, second, and third embodiments.

Lastly, with reference to FIGS. 11 and 12, a description is provided of configurations of hardware that functionally implements the miswiring detector 40 according to the first embodiment, the miswiring detector 40A according to the second embodiment, and the miswiring detector 40B according to the third embodiment.

In order for the miswiring detector 40, 40A, or 40B to be functionally implemented, the configuration can include, as illustrated in FIG. 11, a processor 100 that performs calculations, a memory 102 that stores programs to be read by the processor 100, and an interface 104 through which signals are input or output.

The processor 100 may be an arithmetic unit, a microprocessor, a microcomputer, a central processing unit (CPU), or a digital signal processor (DSP). Examples of the memory 102 include a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, and a digital versatile disc (DVD).

Stored in the memory 102 is the program that functionally implements the miswiring detector 40, 40A, or 40B. The processor 100 transmits and receives necessary information through the interface 104 and also executes the programs stored in the memory 102 to perform various kinds of arithmetic processing that are described in the first, second, and third embodiments. Processing results of the processor 100 can be stored in the memory 102.

The processor 100 and the memory 102 that are illustrated in FIG. 11 may be replaced by a processing circuit 103 as illustrated in FIG. 12. The processing circuit 103 corresponds to a single circuit, a composite circuit, a programmed processor, a parallel programmed processor, an application specific integrated circuit (ASIC), a field-programmable gate array (FPGA), or a combination of these.

The above configurations illustrated in the embodiments are illustrative of contents of the present invention, can be combined with other techniques that are publicly known and can be partly omitted or changed without departing from the gist of the present invention.

REFERENCE SIGNS LIST

1 inverter; 1*a* switching element; 2 induction motor; 3 input circuit; 4, 4A, 4B controller; 5, 27 current detector; 8 gate drive circuit; 11 overhead wire; pantograph; 16 wheel; 18 rail; 22 breaker; 24 filter capacitor; 26 voltage detector; 28 speed detector; 30, 30A, 30B voltage control unit; 31 current command value calculation unit; 33 voltage command value calculation unit; 34 integrator; 35 PWM control unit; 36 coordinate transformer; 38 speed estimator; 40, 40A, 40B miswiring detector; 41 torque estimator; 42, 45, 48 deviation calculation unit; 43, 46, 49 determination unit;

speed converter; 47 input current calculation unit; 50 first drive group; 52 second drive group; 80 electric vehicle drive system; 100 processor; 102 memory; 103 processing circuit; 104 interface.

The invention claimed is:

1. An electric vehicle control device comprising a plurality of drive control systems to control travelling of an electric vehicle, each of the plurality of drive control systems including: an induction motor; an inverter to drive the induction motor; a current detector to detect motor currents flowing through the induction motor; a speed detector to detect a rotational speed of the induction motor; and a controller to control the inverter on a basis of a torque command value, the detected motor currents, and voltage command values calculated on a basis of the detected rotational speed, wherein
the controller includes
a miswiring detector to calculate a torque estimation value on a basis of the motor currents and the voltage command values and to detect miswiring between the induction motor and the inverter on a basis of the calculated torque estimation value and the torque command value.

2. The electric vehicle control device according to claim 1, wherein
the miswiring detector includes:
an estimator to estimate the torque estimation value;
a calculation unit to calculate an absolute value of a deviation between the torque command value and the torque estimation value; and
a determination unit to compare the absolute value of the deviation with a reference value and to determine that the miswiring occurs and output a miswiring detection signal when the absolute value of the deviation is greater than the reference value.

3. An electric vehicle control device comprising a plurality of drive control systems to control travelling of an electric vehicle, each of the plurality of drive control systems including: an induction motor; an inverter to drive the induction motor; a current detector to detect motor currents flowing through the induction motor; and a controller to control the inverter on a basis of a torque command value, voltage command values calculated on a basis of the detected motor currents, and a speed estimation value calculated on a basis of the calculated voltage command values and the detected motor currents, wherein
the controller includes
a miswiring detector to convert a traveling speed of the electric vehicle into a rotational speed of the induction motor and to detect miswiring of the induction motor on a basis of the rotational speed and the speed estimation value.

4. The electric vehicle control device according to claim 3, wherein
the miswiring detector includes:
a calculation unit to calculate an absolute value of a deviation between the rotational speed and the speed estimation value; and
a determination unit to compare the absolute value of the deviation with a reference value and to determine that the miswiring occurs and output a miswiring detection signal when the absolute value of the deviation is greater than the reference value.

5. An electric vehicle control device comprising a plurality of drive control systems to control travelling of an electric vehicle, each of the plurality of drive control systems including: an induction motor; an inverter to drive the induction motor; a first current detector to detect motor currents flowing through the induction motor; and a controller to control the inverter on a basis of a torque command value and voltage command values calculated on a basis of the detected motor currents, the electric vehicle control device further comprising
a second current detector to detect a total of currents flowing into input sides of the inverters of the plurality of drive control systems, wherein
the controller includes
a miswiring detector to calculate, using the torque command value, a total value of currents that flow into input sides of the inverters under proper conditions and to detect miswiring of the induction motor on a basis of the calculated total value of the currents and the torque command value.

6. The electric vehicle control device according to claim 5, wherein
the miswiring detector includes:
a calculation unit to calculate the total value of the currents, using the torque command value;
a calculation unit to calculate an absolute value of a deviation between the total value of the currents and a value detected by the second current detector; and
a determination unit to compare the absolute value of the deviation with a reference value and to determine that the miswiring occurs and output a miswiring detection signal when the absolute value of the deviation is greater than the reference value.

* * * * *